(12) United States Patent
Kim et al.

(10) Patent No.: US 10,444,930 B2
(45) Date of Patent: Oct. 15, 2019

(54) HEAD-MOUNTED DISPLAY DEVICE AND CONTROL METHOD THEREFOR

(71) Applicant: LG ELECTRONICS INC., Seoul (KR)

(72) Inventors: Jongho Kim, Seoul (KR); Doyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 242 days.

(21) Appl. No.: 15/325,203

(22) PCT Filed: Aug. 5, 2014

(86) PCT No.: PCT/KR2014/007245
§ 371 (c)(1),
(2) Date: Jan. 10, 2017

(87) PCT Pub. No.: WO2016/021747
PCT Pub. Date: Feb. 11, 2016

(65) Prior Publication Data
US 2017/0192620 A1 Jul. 6, 2017

(51) Int. Cl.
*G09G 5/00* (2006.01)
*G06F 3/0481* (2013.01)
(Continued)

(52) U.S. Cl.
CPC ......... *G06F 3/0481* (2013.01); *G02B 27/017* (2013.01); *G02B 27/0179* (2013.01);
(Continued)

(58) Field of Classification Search
CPC ...... G06F 3/0481; G06F 3/0346; G06F 3/017; G02B 27/017; G02B 27/0179;
(Continued)

(56) References Cited

U.S. PATENT DOCUMENTS 9,389,703 B1 * 7/2016 Olsen ................ G06F 3/0346
2006/0017657 A1 1/2006 Yamasaki
(Continued)

FOREIGN PATENT DOCUMENTS

JP 2005-192083 A 7/2005
JP 2006-30802 A 2/2006
(Continued)

*Primary Examiner* — Benjamin C Lee
*Assistant Examiner* — Gerald L Oliver
(74) *Attorney, Agent, or Firm* — Birch, Stewart, Kolasch & Birch, LLP

(57) ABSTRACT

The present disclosure relates to a head mounted display (HMD) capable of providing contents to a user in a state of being worn on his or her head, and may include a display unit configured to display a virtual reality image, a sensor configured to recognize objects around the HMD device, and a controller configured to display notification information associated with a preset event when the event occurs, wherein the controller detects an obstacle based on a distance between the HMD device and the recognized object among the recognized objects, and determines a position at which the notification information is displayed based on the detected obstacle.

19 Claims, 10 Drawing Sheets

(51) Int. Cl.
*G02B 27/02* (2006.01)
*G02B 27/22* (2018.01)
*G02B 27/01* (2006.01)
*G06F 3/01* (2006.01)
*G06F 3/0346* (2013.01)
*G06F 3/0484* (2013.01)

(52) U.S. Cl.
CPC ............ *G02B 27/02* (2013.01); *G02B 27/22* (2013.01); *G06F 3/011* (2013.01); *G06F 3/017* (2013.01); *G06F 3/0346* (2013.01); *G06F 3/04815* (2013.01); *G06F 3/04842* (2013.01); *G02B 2027/014* (2013.01); *G02B 2027/0138* (2013.01); *G02B 2027/0141* (2013.01)

(58) Field of Classification Search
CPC ...... G02B 2027/0138; G02B 2027/014; G02B 2027/0141
See application file for complete search history.

(56) References Cited

U.S. PATENT DOCUMENTS

| | | | |
|---|---|---|---|
| 2012/0146894 A1 | 6/2012 | Yang et al. | |
| 2012/0264510 A1 | 10/2012 | Wigdor et al. | |
| 2013/0154906 A1 | 6/2013 | Braun et al. | |
| 2013/0328928 A1* | 12/2013 | Yamagishi | G02B 27/017 345/633 |
| 2013/0335301 A1 | 12/2013 | Wong et al. | |
| 2016/0034042 A1* | 2/2016 | Joo | G02B 27/0172 345/633 |
| 2016/0054795 A1* | 2/2016 | Sasaki | G06F 3/013 345/642 |
| 2017/0372499 A1* | 12/2017 | Lalonde | G02B 27/017 |
| 2018/0174366 A1* | 6/2018 | Nishibe | G06F 3/04842 |

FOREIGN PATENT DOCUMENTS

| | | |
|---|---|---|
| KR | 10-2012-0064557 A | 6/2012 |
| KR | 10-2014-0020177 A | 2/2014 |

* cited by examiner (a)

(b)

(a)

(b)

(a)

(b)

(a)

(b)

HEAD-MOUNTED DISPLAY DEVICE AND CONTROL METHOD THEREFOR

CROSS REFERENCE TO RELATED APPLICATIONS

This application is the National Phase of PCT/KR2014/007245 filed on Aug. 5, 2014, which is hereby expressly incorporated by reference into the present application.

BACKGROUND OF THE DISCLOSURE

1. Field of the Disclosure

The present disclosure relates to a head mounted display (HMD) capable of providing contents to a user in a state of being worn on his or her head.

2. Background of the Disclosure

Head mounted display (HMD) may refer to various image display devices mounted on a user's head like glasses to allow the user to view images (contents). Various wearable computers have been developed according to the lightweight and compact trend of digital devices, and the HMD devices have been also widely used. The HMD device may provide various conveniences to a user in combination with augmented reality technology, N-screen technology, and the like beyond a simple display function.

On the other hand, such an HMD device may also generate a virtual space itself, and provide virtual reality allowing a user to feel a virtual environment like real through the interaction of five senses such as the user's sight, hearing, and the like, in such a virtual space as well as augmented reality using at least part of an real environment around the HMD device.

On the other hand, even when a user wears the HMD device, various notification information such as notifications of incoming messages may be provided to the user. In this case, the HMD device may display the notification information for the user within the virtual space. Furthermore, the HMD device may recognize a user's gesture to receive the user's selection on notification information displayed within the virtual space.

However, when a user takes a gesture to make a touch to notification information, the user may get into danger without knowing it since the user is unable to recognize an actual object, and furthermore, it may occur a case where the notification information disturbs the user's virtual reality experience. As a result, various methods of ensuring the user's safety while displaying notification information, and effectively displaying the notification information on the HMD device without disturbing the user's virtual reality experience have been actively studied.

SUMMARY OF THE DISCLOSURE

An object of the present invention is to provide an HMD device capable of ensuring a user's safety even when the user takes a gesture to notification information in case where the notification information is generated in a state that the user wears the HMD device, and a method of controlling the same.

Another object of the present disclosure is to provide an HMD device capable of allowing the user's virtual reality experience not to be disturbed due to the display of notification information when the notification information is generated in a state that the user wears the HMD device, and a method of controlling the same.

In order to accomplish the foregoing and other objects, according to an aspect of the present disclosure, a head mounted display (HMD) device according to an embodiment of the present disclosure may include a display unit configured to display a virtual reality image, a sensor configured to recognize objects around the HMD device, and a controller configured to display notification information associated with a preset event when the event occurs, wherein the controller detects an obstacle based on a distance between the HMD device and the recognized object among the recognized objects, and determines a position at which the notification information is displayed based on the detected obstacle when the occurred notification information is notification information that requires a user's interaction.

According to an embodiment, the controller may recognize a region corresponding to a position of the detected obstacle from the virtual reality image, and display the notification information in another region excluding the recognized portion.

According to an embodiment, the controller may select a virtual reality object corresponding to the detected obstacle from the virtual reality image, and display the notification information in another region excluding a region on the virtual reality image displayed with the selected virtual reality object.

According to an embodiment, the controller may distinguish and display notification information that requires a user's interaction and notification information that does not require the user's interaction in a separate manner.

According to an embodiment, the controller may determine whether or not the notification information is notification information that requires the user's interaction based on whether the notification information requires an additional user's check or the notification information unilaterally transfers information to the user.

According to an embodiment, the notification information that requires the user's interaction may be an short messaging service (SMS) or social network service (SNS) message or notification information for notifying an incoming call.

According to an embodiment, when the notification information is notification information that requires a user's interaction and notification information that does not require the user's interaction, the controller may display them with different perspectives.

According to an embodiment, in case of the notification information that does not require the user's interaction, the controller may display the notification information in such a manner that a virtual reality image displayed in a region displayed with the notification information can be identified through the region displayed with the notification information.

According to an embodiment, the controller may select a virtual object corresponding to the detected obstacle from the virtual reality image, and display the notification information based on a shape of the selected virtual object.

According to an embodiment, when the selected virtual object is a table or chair, the controller may display the notification information in a shape in which the notification information is placed on the virtual object.

According to an embodiment, the controller may display the notification information with a graphic object in a shape attached to a surface of a virtual object corresponding to the detected obstacle.

According to an embodiment, when a position at which the notification information is displayed is determined, the controller may further evaluate the importance of a virtual reality image displayed at the determined position to change the position at which the notification information is displayed.

According to an embodiment, the controller may evaluate the importance according to at least one of the movements or display state of virtual objects on a virtual reality image displayed at the determined position, and the types of the virtual objects.

According to an embodiment, the controller may display the notification information in another region excluding a region on a virtual reality image with an amount of movement of the virtual objects above a preset level based on the evaluated importance or displayed in a state that the virtual objects are close up or a region on a virtual reality image in which the virtual object is displayed as a subtitle or instruction.

According to an embodiment, the controller may detect objects in which a distance between the HMD device and the recognized object corresponds to the user's arm length among the recognized objects as the obstacle.

According to an embodiment, the HMD device may further include a sensing unit configured to sense a current position, wherein the controller stores a result of recognizing at least one object located at a specific place according to the user's selection, and recognizes objects around a current user using the recognition results of the prestored objects when a current position is the specific place as a result of sensing the position.

According to an embodiment, the HMD device may further include a camera capable of receiving an image for objects around the user, wherein when the object is recognized and the obstacle is detected based on an image of the received object, the controller selects a virtual object corresponding to a shape of the detected obstacle from a virtual reality image currently displayed on the display unit.

According to an embodiment, when a virtual object corresponding to a shape of the detected obstacle is not included in the virtual reality image, the controller may generate and display a virtual object corresponding to the shape of the obstacle on the virtual reality image.

According to an embodiment, the controller may determine a position at which notification information is displayed based on a shape of object for each object based on the recognized object.

In addition, in order to accomplish the foregoing and other objects, according to an aspect of the present disclosure, a control method of a head mounted display (HMD) device may include displaying a virtual reality image, and recognizing objects around a user, detecting objects located within a preset distance among the recognized objects as an obstacle, detecting whether or not a preset event has occurred, and displaying notification information corresponding to the occurred event on the virtual reality image based on a position of the detected obstacle when the preset event has occurred.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1A:
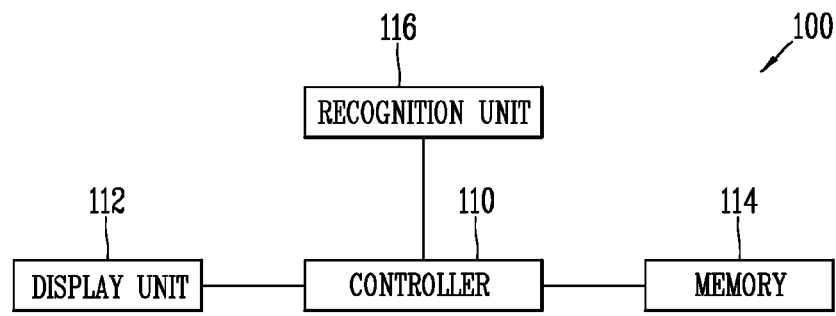
FIG. 1A is a block diagram illustrating an HMD device according to an embodiment of the present disclosure.

FIG. 1A is a block diagram illustrating an HMD device according to an embodiment of the present disclosure.

Referring to FIG. 1A, an HMD device 100 according to an embodiment of the present disclosure may include a controller 110, a display unit 112 connected to the controller 110, a recognition unit, and a memory 114. Furthermore, the HMD device 100 may further include a camera, a wireless communication unit, an audio output unit, and the like. In other words, the HMD device 100 described in the preset specification may of course have a larger or smaller number of constituent elements than those listed in the above.

More specifically, the HMD device 100 may be configured to be worn on a head portion (or head) of a human body, and provided with a frame portion (case, housing, etc.).

The frame portion is supported by a head portion, and provided with a space in which various components are mounted. As illustrated in the drawing, components such as the controller 110, the recognition unit 140 and the like may be mounted on the frame portion. Furthermore, the display unit 112 covering at least one of the left and the right eye may be detachably mounted on the frame portion.

The display unit 112 may be mounted on a head to perform the role of directly showing an image in front of a user's eyes. When the user wears the HMD device 100, the display unit 112 may be disposed to correspond to at least one of the left and the right eye.

Furthermore, the display unit 112 may project an image to a user's eyes using a prism. Furthermore, the prism may be formed of a transmissive material to allow the user to view the projected image and a general field of view (a scope viewed through the user's eyes) in the front at the same time. In addition, an image displayed through the display unit 112 as described above may be viewed in an overlapping manner with a general field of view. The HMD device 100 may provide augmented reality (AR) for showing one image by overlapping a virtual image with a real image or background using such display characteristics.

On the other hand, the recognition unit 140 may include at least one sensor for recognizing the surrounding environment of the HMD device 100. For example, the recognition unit 116 may include at least one of sensors such as a proximity sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera), a microphone, a battery gage, and the like. Furthermore, the controller 110 may use information sensed from at least one or more sensors among those sensors to recognize the surrounding environment of the HMD device 100.

Furthermore, the HMD device 100 may include a microphone (not shown) and an audio output unit for outputting an audible sound. The audio output unit may be configured to transfer the audible sound in a general audio output manner or an osteoconductive manner.

Furthermore, though not disclosed in the drawing of FIG. 1A, the HMD device 100 according to an embodiment of the present disclosure may further include a wireless communication unit (not shown). In addition, the wireless communication unit may include one or more modules capable of allowing wireless communication between the HMD device 100 and the wireless communication system, between the HMD device 100 and an external device, between the HMD device 100 and a remote controller for controlling the same or between the HMD device 100 and an external server. Moreover, the wireless communication unit may include one or more modules for connecting the HMD device 100 to one or more networks.

Furthermore, the wireless communication unit may further include at least one of a broadcast receiving module, a mobile communication module, a wireless Internet module, a short-range communication module, and a location information module.

On the other hand, the memory 114 stores data supporting various functions of the HMD device 100. The memory 114 may store a plurality of application programs (or applications) executed in the HMD device 100, data for the operation of the HMD device 100, instructions, and the like. At least some of those application programs may be downloaded from an external server via wireless communication. Furthermore, some others of those application programs may exist within the mobile terminal 100 at the time of factory shipment for basic functions of the HMD device 100. On the other hand, the application programs may be stored in the memory, installed in the HMD device 100, and executed by the controller 110 to perform an operation (or a function) of the HMD device 100.

On the other hand, the controller 110 may typically control an overall operation of the HMD device 100. The controller 110 may provide or process information or functions appropriate for a user in a manner of processing signals, data, information and the like, which are input or output by the aforementioned constituent elements, or activating the application programs stored in the memory 114.

In other words, the controller 110 may generate a virtual space according to information stored in the memory 114 or the user's selection, and provide visual information and auditory information associated with the generated virtual space to the user through the display unit 112 and audio output unit, thereby providing virtual reality for allowing the user to feel the virtual space like reality.

In a state that virtual reality is provided to the user as described above, the controller 110 may recognize surrounding objects using at least one sensing value sensed from the sensor of the recognition unit 116. Furthermore, when an event that should be notified to the user occurs, the controller 110 may provide notification information to the user to notifying the occurrence of such an event to the user, and the notification information may be provided in the form of visual information displayed on the display unit 112 or auditory information.

In this case, the controller 110 may display the notification information based on a surrounding environment recognized through the recognition unit 116. In other words, the controller 110 of the HMD device 100 according to an embodiment of the present disclosure may determine a distance between the recognized surrounding objects through the recognition unit 116 to determine whether or not there is a threatening obstacle to the user's safety. Furthermore, when there is a threatening obstacle to the user's safety among the surrounding objects, the controller 110 may display the notification information by using an object or region within a virtual reality corresponding to the obstacle or avoiding an object or region within a virtual reality corresponding to the obstacle.

For the purpose of this, the controller 110 of the HMD device 100 according to an embodiment of the present disclosure may use a result of recognizing obstacles to at least one specific place in advance. In this case, the controller 110 may recognize objects to at least one specific place in advance, and information corresponding to the recognized objects may be stored in advance in the memory 114.

On the other hand, the controller 110 may display the notification information at a position at which the user's virtual reality experience is the least disturbed in displaying the notification information. In other words, the controller 110 may display the notification information at a portion determined to have the lowest importance on visual information associated with a virtual space, namely, a virtual reality image displayed on the display unit 112. For example, the controller 110 may evaluate the importance based on the movement or motion state of virtual objects on a current virtual reality image or evaluate the importance based on an object itself displayed on a virtual reality object.

In this case, the controller 110 may further consider a portion determined to have a high importance on the virtual reality image in determining the display position of the notification information based on an object within virtual reality corresponding to a threatening obstacle to the user's safety. As a result, the HMD device 100 according to an embodiment of the present disclosure may provide notification information to the user while not disturbing the user who experiences virtual reality to the maximum as well as protecting the user's body in displaying the notification information.

On the other hand, the power supply unit receives external power, internal power under the control of the controller 110 to supply power to each constituent element included in the HMD device 100. The power supply unit may include a battery, and the battery may be an integrated battery or replaceable battery.

At least part of the each constituent element may operate in a cooperative manner to implement an operation, a method or control method of the HMD device 100 according to various embodiments described below. Furthermore, the operation, method or control method of the HMD device 100 may be implemented on the HMD device 100 by the driving of at least one application program stored in the memory.

Figure 1B:
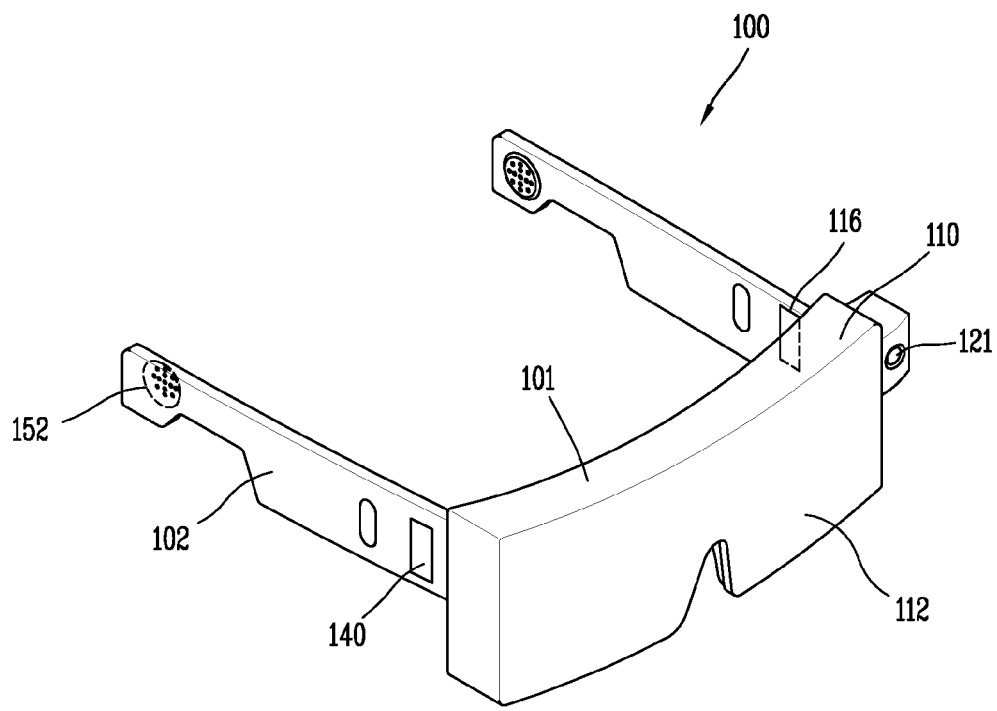
FIG. 1B is an exemplary view illustrating an example of an HMD device according to an embodiment of the present disclosure.

FIG. 1B is an exemplary view illustrating an example of the HMD device 100 according to an embodiment of the present disclosure.

Referring to FIG. 1B, the HMD device 100 according to an embodiment of the present disclosure may be implemented in the form of being mounted on a user's head, and provided with a frame portion therefor. The frame portion may be formed of a flexible material to facilitate wearing. According to the present drawing, it is illustrated that the frame portion includes a first frame 101 and a second frame 102 with different materials.

The frame portion is supported by the head to provide a space in which various components are mounted. As illustrated in the drawing, the frame portion may be mounted with electronic components such as the controller 110, the recognition unit 140, the audio output unit 152, and the like. Furthermore, the frame portion may be detachably mounted with the display unit 112 covering at least one of the left and the right eye.

The display unit 112 may be formed to cover both the left and the right eye to display an image toward both the left and the right eye of the user. Furthermore, the display unit 112 may be configured with a stereoscopic display unit displaying a stereoscopic image. Furthermore, a left and a right image required to implement a 3-dimensional stereoscopic image may be displayed on the stereoscopic display unit by a stereoscopic processing unit. The stereoscopic processing unit may be configured to receive a 3D image (an image at a reference time point and an image at an extended time point) to set a left and a right image therefrom or receive a 2D image to convert it into the left and the right image.

The audio output unit 152 may output audio data received from the wireless communication unit or stored in the memory in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the HMD device 100. The audio output module 152 may include a receiver, a speaker, a buzzer or the like.

On the other hand, the recognition unit 116 may recognize objects around the HMD device 100 as described above, and determine whether or not the recognized object is a threatening obstacle to the user's body. The recognition unit 116 may be implemented with a laser sensor, an infrared sensor, an ultrasonic sensor, and the like, and recognize the positions of objects around the HMD device 100 and a separated distance between the objects using light, infrared ray, ultrasonic waves. Furthermore, the recognition unit 116 may distinguish objects corresponding to the obstacle among the surrounding objects based on the recognized separation distance.

Alternatively, the controller 110 is able to calculate the position of a wave source through information sensed from a light sensor and a plurality of ultrasonic sensors. For example, the position of the wave source may be calculated using that a period of time for which light reaches the light sensor is faster than that for which ultrasonic waves reach the ultrasonic sensor. More specifically, the position of the wave source may be calculated using a time difference from a time at which ultrasonic waves reach the point with light as a reference signal.

Furthermore, the HMD device 100 according to an embodiment of the present disclosure may further include a camera 121. For example, the camera 121 may be disposed adjacent to at least one of the left and the right eye, and formed to capture an image in the front. In this case, the camera 121 may be located adjacent to the eyes, a scene viewed by the user may be acquired with an image. Furthermore, it is illustrated in the above FIG. 1B that only one camera 121 is included therein, but the present disclosure may not be necessarily limited to this. For example, a plurality of cameras 121 may be formed therein or formed to have a plurality of lenses and configured to acquire a stereoscopic image.

On the other hand, the camera 121 and the laser sensor may be combined with each other to sense a user's gesture to a virtual reality image, for example, a user's touch to a specific virtual reality object. The camera 121, namely, photo sensor, may perform coordinate calculation for a sensing subject, namely, a user's specific body portion, according to a variation of light, thereby acquiring position information in which the user's body portion faces. In this case, the controller 110 may identify a virtual reality object, namely, virtual object, specified by the user's body portion within the virtual reality image based on the acquired position information. Here, the virtual object may be various objects included in the virtual reality image or various notification information displayed on the virtual reality image.

Furthermore, the HMD device 100 according to an embodiment of the present disclosure may include a haptic module (not shown) configured to generate various tactile effects which a user can feel. A representative example of the tactile effects generated by the haptic module includes vibration. Vibration generated by the haptic module 154 may have a controllable intensity, a controllable pattern, and so on. For instance, different vibration may be output in a synthesized manner or in a sequential manner.

The haptic module may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module may be configured to transmit tactile effects through a user's direct contact, or a user's muscular sense using a finger or a hand. The haptic module may be implemented in two or more in number according to the configuration of the HMD device 100.

On the other hand, the HMD device 100 according to an embodiment of the present disclosure may include a wireless communication unit, and the wireless communication unit may include at least one of a broadcast receiving module, a mobile communication module, a wireless Internet module, a short-range communication module, a location information module, and the like.

The broadcast receiving module of the wireless communication unit may receive a broadcast signal and/or broadcast associated information from an external broadcast managing entity via a broadcast channel. The broadcast channel may include a satellite channel and a terrestrial channel. At least two broadcast receiving modules may be provided in the HMD device 100 to simultaneously receive at least two broadcast channels or switch the broadcast channels.

The mobile communication module may transmit and receive wireless signals to and from at least one of a base station, an external mobile terminal, a server, and the like, on a mobile communication network, which is constructed according to technical standards or transmission methods for mobile communications.

The wireless signals may include a voice call signal, a video call signal, or various formats of data according to transmission and reception of text/multimedia messages.

The wireless Internet module may denote a module for wireless Internet access, and be internally or externally coupled to the HMD device 100. The wireless Internet module 113 is configured to transmit and receive wireless signals via communication networks according to wireless Internet technologies.

On the other hand, from the perspective that the wireless Internet accesses are executed via a mobile communication network, the wireless Internet module which performs the wireless Internet access via the mobile communication network may be understood as a type of the mobile communication module.

The short-range communication module capable of performing short-range communication may support wireless communications between the HMD device 100 and a wireless communication system, between the HMD device 100 and an external device, or between the HMD device 100 and a remote controller for controlling the same, or between the HMD device 100 and an external server.

On the other hand, the location information module, as a module for acquiring the location (or current location) of the HMD device 100, may acquire the location of the HMD device 100 based on the information of a wireless access point (AP) for transmitting or receiving wireless signals to or from GPS satellites or Wi-Fi modules.

Hereinafter, embodiments associated with a control method which can be implemented in the HMD device 100 having the foregoing configuration will be described with reference to the attached drawings. It should be understood by those skilled in the art that the present invention can be embodied in other specific forms without departing from the concept and essential characteristics thereof.

Figure 2:
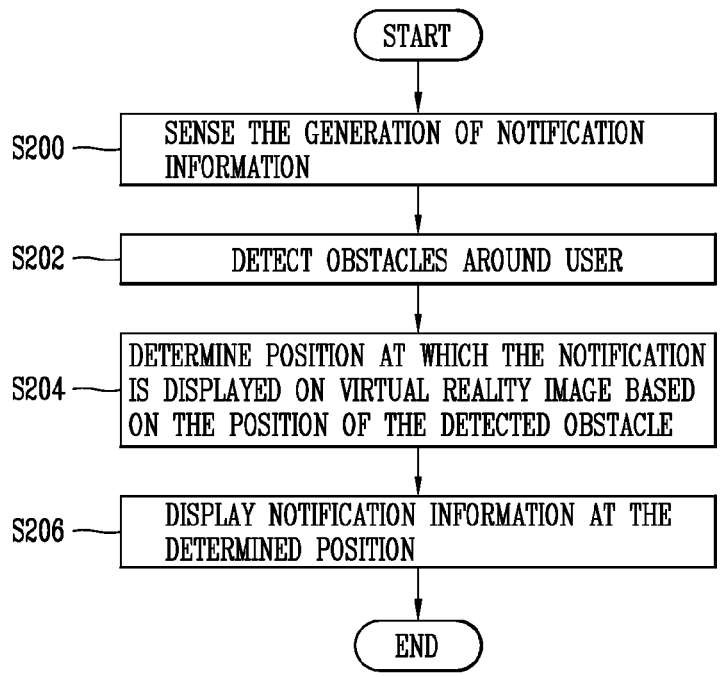
FIG. 2 is a flow chart illustrating an operation process of an HMD device according to an embodiment of the present disclosure.

FIG. 2 is a flow chart illustrating an operation process of the HMD device according to an embodiment of the present disclosure.

Referring to FIG. 2, the controller 110 of the HMD device 100 according to an embodiment of the present disclosure may provide visual information and auditory information associated with virtual reality according to a user's selection. Furthermore, the controller 110 may recognize objects around the user while at the same time providing information associated with the virtual reality to the user. In addition, in a state that information associated with the virtual reality is provided, the controller 110 may sense whether notification information to be provided to a user has been generated (S200).

For example, when a preset event has occurred, the controller 110 may determine that the notification information has been generated. There may be various events. For example, when a short messaging service (SMS) or social network service (SNS) message is newly received at the HMD device 100, the controller 110 may determine that the event has occurred. Otherwise, information on an insufficient battery, an accessible access point (AP) or the like or an alarm for notifying the user of a current time or preset time point has been generated, the controller 110 may determine that the even has occurred.

On the other hand, when the generation of notification information is sensed during the step S200, the controller 110 detects whether there is a threatening obstacle to the user's body among currently recognized objects (S202). Here, the controller 110 may recognize the objects as the obstacle based on a distance between a current user and the recognized objects among the recognized objects. For example, the controller 110 determines whether or not only objects located within a distance corresponding to the user's arm length, namely, a distance of approximately 1 m, among the objects are threatening objects to the user's body, namely, the obstacles.

Furthermore, the controller 110 may determine a position at which the notification information is displayed based on a position of the detected obstacle (S204). For example, the controller 110 may recognize the position and direction of the obstacle, and display the notification information in an region on a virtual reality image excluding a region corresponding to the position and direction of the obstacle on another virtual reality image displayed on the display unit 112 in determining a position at which the notification information is displayed. When the notification information is displayed in a state that the user receives information on virtual reality, it is to prevent the user from being injured due to an obstacle around the user even when the user takes a gesture to the displayed notification information.

On the other hand, on the contrary, the controller 110 may of course display the notification information using the detected obstacle during the step S204. For example, the controller 110 may generate a virtual object corresponding to the detected obstacle during the S202 to display it on a virtual reality image currently provided to the user, and display the notification information around the virtual object. Otherwise, the controller 110 may select an object corresponding to the position and shape of the detected obstacle among virtual objects included in a currently provided virtual reality image, and display the notification information around the selected virtual object.

For this purpose, the controller 110 may more accurately recognize objects around the user at a current place. For example, the controller 110 may accurately recognize the type or shape of objects around the user from images of objects around the user entered through the camera 121 provided in the HMD device 100 according to the user's selection. Furthermore, the recognized information on the surrounding objects may be store in the memory 114 according to the user's selection, and used anytime again according to the user's selection. In other words, the controller 110 may store information on a place at which the user is currently located along with the recognized information on the surrounding objects, and when the user is determined to be located at the same place later, information on the recognized surrounding objects will be used anytime again.

On the other hand, when a position at which the notification information is displayed is determined during the step S204, the controller 110 may display the notification information at the determined position (S206). As a result, the HMD device 100 according to an embodiment of the present disclosure may display the notification information based on a position of the detected obstacle around the user, and when the user takes a gesture to the notification information, it may be possible to prevent the user from being injured due to the obstacle in advance.

On the other hand, during the step S206, the controller 110 may determine a position at which the notification information is displayed in consideration of a virtual reality image currently displayed on the display unit 112. For example, the controller 110 may of course minimize the user's virtual reality experience from being disturbed in displaying the notification information based on virtual objects in the currently displayed virtual reality image.

In other words, the controller 110 may determine whether or not the notification information covers a highlighted portion within currently displayed virtual reality or is displayed at a specific position disturbing the user's immersion based on the currently determined display position of notification information and virtual objects displayed at the position. Furthermore, when the notification information is displayed at a position covering the specific position or highlighted portion, the controller 110 may of course display the notification information in another region on a virtual reality image excluding the positions. An operation process of displaying notification information by avoiding a position covering a specific position or highlighted region on the virtual reality image will be described in more detail with reference to FIG. 6.

On the other hand, the controller 110 may of course determine a position at which notification information is displayed according to the type of the notification information in determining the position displayed with the notification information during the step S204. For example, the controller 110 may determine a position at which notification information is displayed based on a position of the detected obstacle according to whether or not the notification information requires the user's interaction, namely, the user's gesture response to the notification information, based on the type of the generated notification information.

In this case, the controller 110 may distinguish and display the currently generated notification information according to whether or not it requires the user's interaction. It may allow the user to distinguish whether or not the currently generated notification information requires the user's interaction, thereby allowing the user to take a gesture only in case of information requiring an interaction.

Figure 3:
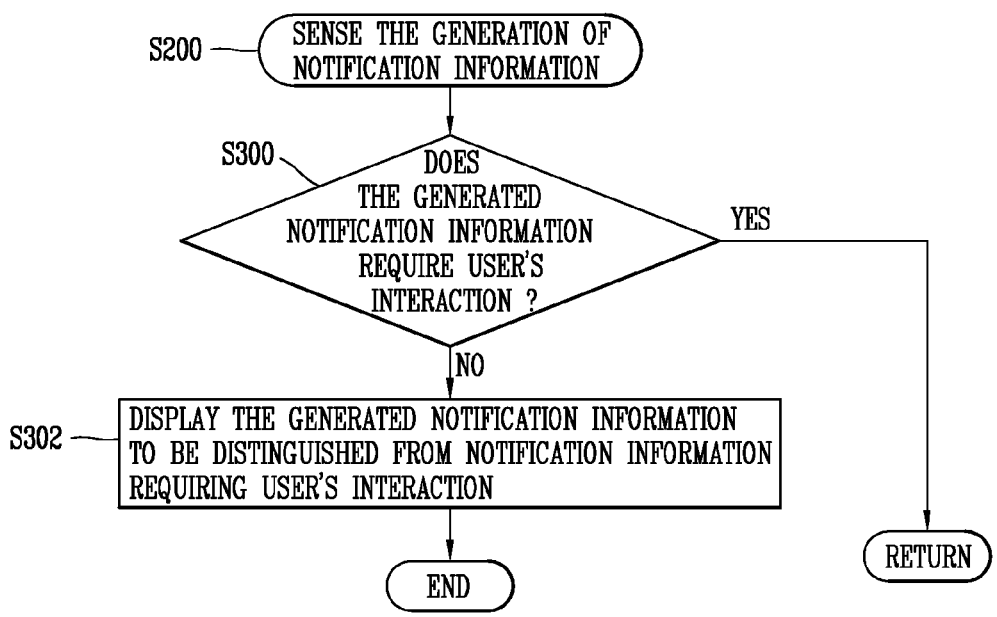
FIG. 3 is a flow chart illustrating an operation process of differently displaying notification information according to whether or not the notification information requires a user's interaction.

FIG. 3 is a flow chart illustrating an operation process of differently displaying notification information according to whether or not the notification information requires a user's interaction in this case.

For example, the controller 110 of the HMD device 100 according to an embodiment of the present disclosure may determine whether or not the currently generated notification information requires the user's interaction (S300). For example, the controller 110 may determine that the notification information is information requiring the user's interaction in case where the currently generated notification information is information requiring the user's check such as a newly received SMS or SNS message or incoming call. Furthermore, when the currently generated notification information is information for displaying the notification of a current time, the expiration of a preset period of time or the like or notification information for merely providing specific information to the user such as the current status of a battery, the controller 110 may determine it as notification information that does not require the user's interaction.

Furthermore, the controller 110 may display notification information in a distinguished manner according to a result of the determination of the step S300. In other words, when the notification information is information that does not require the user's interaction, the controller 110 may display the currently generated notification information to be distinguished from information that requires the user's interaction. For example, the controller 110 may display the notification information in such a manner that it seems to be located at a far distance where the user's hand does not reach, or display the notification information at a position at which the user's hand does not reach such as "sky" on a virtual reality image displayed through the display unit 112. Otherwise, when it is notification information that does not require the user's interaction, the controller 110 may display virtual objects on the virtual reality image to be identifiable through the notification information.

On the other hand, the controller 110 may determine a position at which notification information is displayed based on a position of the detected obstacle around the user only when the notification information is notification information that requires the user's interaction, namely, the user's gesture to the notification information. In this case, as a result of the determination of the step S300, when the generated notification information is notification information that requires the user's interaction, the controller 110 may proceed to the step S204 to detect an obstacle among objects around the user, and determine a position at which the notification information requiring the user's interaction is displayed based on a position of the detected obstacle.

On the other hand, according to the foregoing description, the HMD device 100 according to an embodiment of the present disclosure, it has been described that a position displayed with notification information can be detected based on a position of the detected obstacle. In other words, the HMD device 100 according to an embodiment of the present disclosure may display the notification information in another region excluding a region on a virtual reality image corresponding to a position of the detected obstacle or display the notification information using the detected obstacle in displaying the notification information. For example, the controller 110 may display the notification information using a virtual object corresponding to the detected obstacle.

Figure 4:
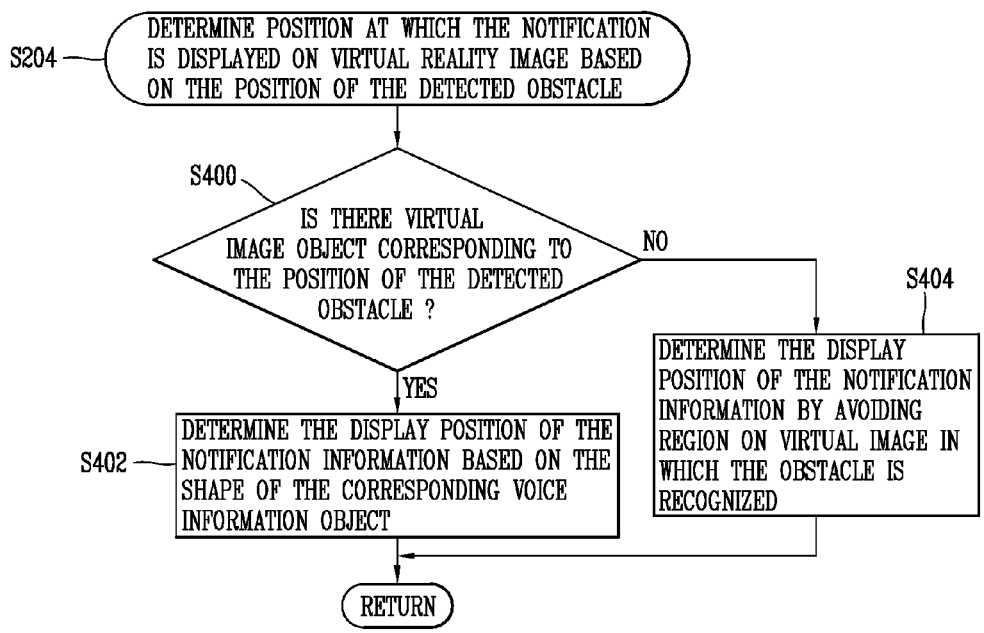
FIG. 4 is a flow chart illustrating an operation process of recognizing an obstacle around an HMD device and displaying notification information according to the recognized obstacle in displaying the notification information.

FIG. 4 is a flow chart illustrating an operation process of recognizing an obstacle around an HMD device and displaying notification information according to the recognized obstacle in displaying the notification information as described above.

Referring to FIG. 4, when an obstacle is detected among objects around the user during the step S202, the controller 110 of the HMD device 100 according to an embodiment of the present disclosure determines whether or not there exists a virtual object corresponding to a position of the currently detected obstacle (S400). Furthermore, as a result of the determination of the step S400, when a virtual object corresponding to a position of the currently detected obstacle is displayed on a current virtual reality image, the controller 110 may determine a position at which the notification information is displayed based on a shape of the corresponding virtual object (S402). For example, during the step S402, the controller 110 may display the notification information in another region excluding a region on a virtual reality image displayed with the corresponding virtual object.

Otherwise, the controller 110 may detect whether or not a virtual object corresponding to a shape of the detected obstacle is displayed in a region on a virtual reality image corresponding to the position of the detected obstacle based on the shape of the currently detected obstacle. For example, the controller 110 may recognize the position and shape of various objects located at a specific place in advance according to the user's selection, and store information on the recognized objects in advance. Furthermore, as a result of sensing the position, when a current position is the specific place, the controller 110 may recognize the shape of objects around the user using the recognized information of the prestored objects. Furthermore, in this case, the controller 110 may detect objects located within a predetermined distance from the user among the objects, and recognize the shape of the obstacles based on the recognized information of objects detected as obstacles.

In this case, the controller 110 may determine whether or not there exists a virtual object corresponding to the obstacle based on a shape of the detected obstacle. In other words, when the detected obstacle has a horizontal plane on which another object can be placed, such as a desk or table, the controller 110 may determine that a virtual object such as a desk or table or a bed or chair corresponding to a position of the currently detected obstacle is a virtual object corresponding to the detected obstacle. Otherwise, when the detected obstacle has a vertical plane such as a wall or cupboard, the controller 110 may determine that a virtual object such as a wall, a TV set, a computer monitor or a window corresponding to a position of the currently detected obstacle is a virtual object corresponding to the detected obstacle.

In this case, the controller 110 may determine a position at which the notification information is displayed based on a shape of the virtual object. For example, the controller 110 may determine a position at which the notification information is displayed using a shape placed on the virtual object (in case of a virtual object such as a table, a bed, a chair or the like) or determine a position at which the notification information is displayed using a shape attached thereto (in case of a virtual object such as a window, a cupboard, a monitor or the like) such as a Post-it note. In this case, the controller 110 may display the notification information in a state that it is placed on a virtual object such as a desk or table during the step S206 or a state of being attached onto a virtual object such as a wall or monitor.

On the other hand, the foregoing description has described that a shape of the obstacle is recognized only for specific places at which objects have been recognized in advance, but the present disclosure may not be, of course, necessarily limited to this. For example, the controller 110 may recognize the shape of the obstacle in an extremely simple manner. In other words, the controller 110 may receive an image of an object detected as an obstacle among objects recognized through the recognition unit 116 the camera 121 provided therein. Furthermore, the controller 110 may analyze the image of the received obstacle to determine whether the obstacle is a shape having a horizontal plane or a shape having a vertical plane. Furthermore, when the obstacle has a horizontal plane or vertical plane, the controller 110 may determine whether or not a virtual object corresponding to the obstacle is included in a current virtual reality image based on an area of the vertical or horizontal plane. In this case, it may be possible to search a virtual object corresponding to the detected obstacle based on a result of recognizing objects around the user without any information on the previously recognized objects.

On the other hand, during the step S402, when a virtual object corresponding to a position of the currently detected obstacle is not included in a currently displayed virtual reality image, the controller 110 may determine a position at which the notification information is displayed in another region excluding a region corresponding to the position and/or direction of the detected obstacle on the virtual reality image. Otherwise, the controller 110 may of course generate and display a virtual object corresponding to the detected obstacle on a virtual reality image, and display the notification information based on the generated virtual object. In other words, as a result of recognizing an obstacle around the user as described above, when there is prestored information corresponding to the recognized obstacle, the controller 110 may generate a new virtual object based on the prestored information and display it in a region on a virtual reality image corresponding to a position at which the obstacle is located. Furthermore, the controller 110 may display the notification information based on a shape of the displayed virtual object.

Otherwise, the controller 110 may recognize the obstacle based on whether or not the recognized obstacle has a horizontal plane or vertical plane above a predetermined size as described above. In this case, a virtual object corresponding to the recognized obstacle may be displayed in a region on a virtual reality image corresponding to a position at which the obstacle is located.

On the other hand, according to the foregoing description, it has been mentioned that the controller 110 of the HMD device 100 according to an embodiment of the present disclosure can display the notification information at a position at which the user's virtual reality experience is the least disturbed.

Figure 5:
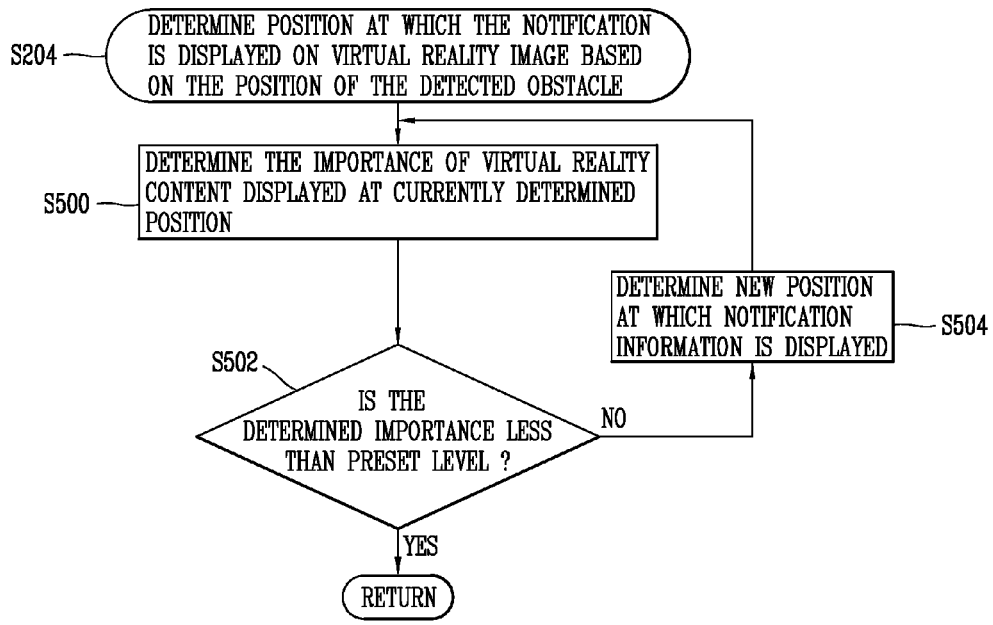
FIG. 5 is a flow chart illustrating an operation process of displaying notification information at a position at which a user's virtual reality experience is not the most disturbed in an HMD device according to an embodiment of the present disclosure.

FIG. 5 is a flow chart illustrating an operation process of displaying notification information at a position at which a user's virtual reality experience is not the most disturbed in an HMD device according to an embodiment of the present disclosure.

Referring to FIG. 5, when a position on a virtual reality image to display the notification information is determined during the step S202, the controller 110 of the HMD device 100 according to an embodiment of the present disclosure may evaluate the importance of a virtual reality content displayed at a currently determined position (S500). Furthermore, the controller 110 may determine whether or not to display notification information at a display position of currently determined notification information according to whether or not the importance evaluated during the step S500 is less than a predetermined level (S502).

For example, the controller 110 may evaluate the importance based on virtual objects displayed at a position at which the display of a current notification information is determined during the step S500. Here, when a movement variation of virtual objects displayed at a position at which the display of the notification information is determined, namely, a movement of virtual objects displayed at a position at which the display of the notification information is determined, is above a preset level or there are virtual objects displayed in a closed-up state in a region in which the display of the notification information is determined, the controller 110 may highly evaluate the importance of a virtual reality content displayed at which notification information is currently determined.

In addition, the controller 110 may display the notification information by avoiding a region on a virtual reality image displayed with information having the user's high concentration. For example, the controller 110 may highly evaluate the importance in case of a virtual object such as a subtitle or instruction of a virtual reality content that is currently experienced by the user.

Furthermore, when the importance of a virtual reality content in a region displayed with the notification information is evaluated according to the movement or type of virtual objects, the controller 110 may display the notification information in a region currently determined according to the evaluated importance or another region. In other words, when the evaluated importance is less than a preset level during the step S500, the controller 110 may proceed to the step S206 to display the notification information at a currently determined position, and when the evaluated importance is above a preset level, the controller 110 may determine a new position at which notification information is displayed (S504). Here, the controller 110 may, of course, newly determine a position at which the notification information is displayed based on a position of the detected obstacle around the user as illustrated in the foregoing process of FIG. 4.

On the other hand, according to the foregoing description, it has been mentioned that the HMD device 100 according to an embodiment of the present disclosure can use the information of a previously recognized object in connection with the sensed position information.

Figure 6:
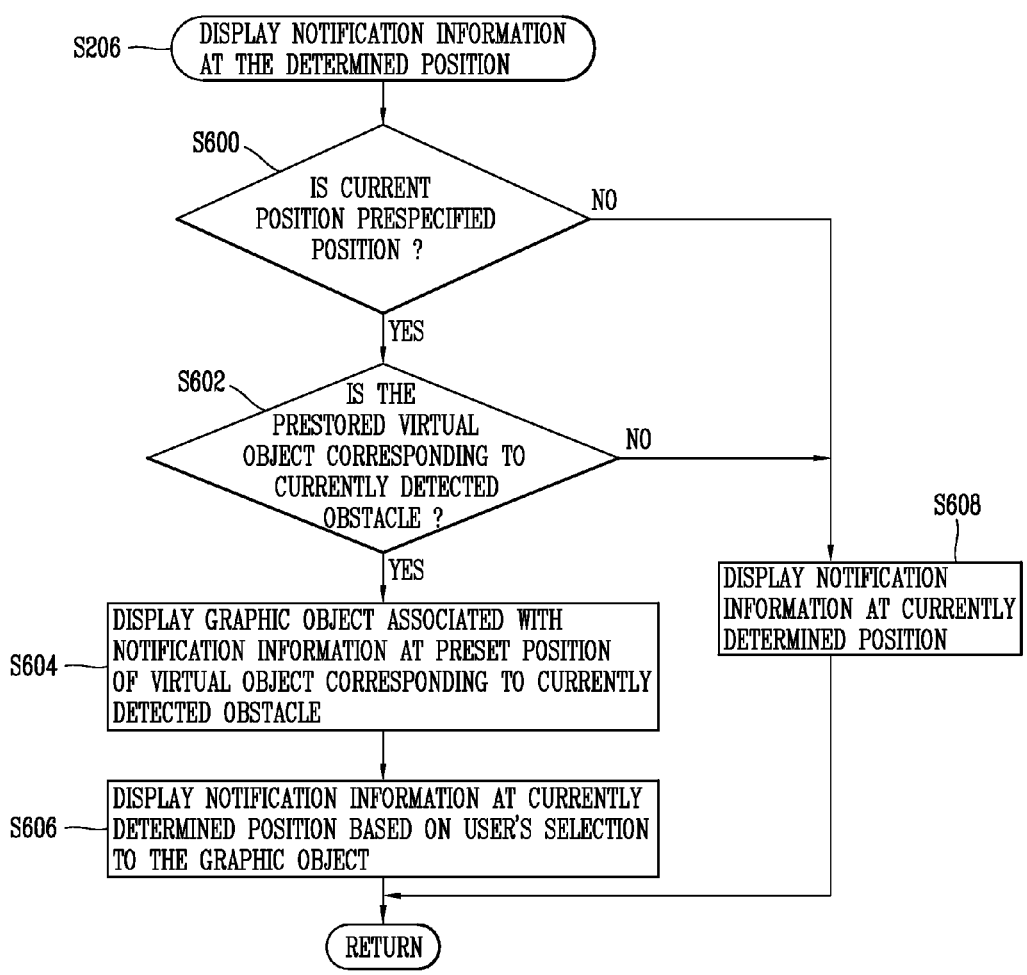
FIG. 6 is a flow chart illustrating an operation process of displaying notification information using a virtual object corresponding to a previously recognized obstacle in an HMD device according to an embodiment of the present disclosure.

FIG. 6 is a flow chart illustrating an operation process of displaying notification information using a virtual object corresponding to a previously recognized obstacle in an HMD device according to an embodiment of the present disclosure.

Referring to FIG. 6, when a position at which notification information is displayed is determined during the step S204, the controller 110 of the HMD device 100 according to an embodiment of the present disclosure may display the notification information at a position different from the determined position based on the current position of the HMD device 100. In other words, when a position at which notification information is displayed is determined during the step S204, the controller 110 may sense the current position of the HMD device 100, and whether or not the sensed position is a previously specified place. Furthermore, when the current position of the HMD device 100 is not a place previously specified by the user as a result of determination of the step S600, the controller 110 displays notification information a currently determined position (S608). In this case, the controller 110 may of course change the display position of the notification information based on a virtual reality content displayed at the display position of the notification information.

However, as a result of the determination of the step S600, when the current position of the HMD device 100 is a place previously determined by the user, the controller 110 recognizes objects around the user, and detects whether or not there is a threatening object, namely, obstacle, to the user's body among the recognized objects. Here, the controller 110 may detect part of the recognized objects as the obstacle based on a distance between the user and the recognized objects. Meanwhile, when the current position of the HMD device 100 is a place previously specified by the user as described above, information that has recognized the objects using an image that has captured objects located at a current place through the camera 121 may be previously stored in the memory 114. Furthermore, when there is information on objects previously recognized for a current place as described above, the controller 110 may more accurately recognize the type and shape of the currently detected obstacle.

In this case, the controller 110 may determine whether or not a virtual object corresponding to a currently detected obstacle is included in a virtual reality image currently displayed on the display unit 112 (S602). Furthermore, when the virtual object corresponding to a currently detected obstacle is displayed on the display unit 112 as a result of the determination of the step S602, the controller 110 may display the notification information at a preset position based on the virtual object (S604). In other words, the controller 110 may determine a position at which notification information is displayed in advance based on the detected obstacle, and display the notification information at the predetermined position for a virtual object corresponding to the detected obstacle.

Here, a position previously determined based on the detected obstacle may be determined according to the type and shape of the detected obstacle. For example, as described above, when the detected obstacle is a chair or table, a virtual object corresponding thereto may be also a chair or table, and in this case, may have a horizontal plane above a predetermined size. Furthermore, the controller 110 may previously set a predetermined region on the horizontal plane to a region displayed with the notification information, and display the notification information in a shape in which the notification information is placed on a virtual object such as the chair or table.

In addition, if the notification information is information that requires the user's interaction, then the controller 110 may display a graphic object corresponding to the notification information instead of the notification information (S604). Furthermore, if there is the user's selection to the graphic object, the controller 110 may display the notification information at a predetermined position on the display unit 112 (S606). An example of displaying a graphic object according to the user's selection and displaying the notification information based on the user's gesture to the graphic object in case of the notification information that requires the user's interaction will be described with reference to FIGS. 10A and 10B.

On the other hand, in the above description, an operation process of allowing the user to determine a position at which notification information is displayed and display the notification information based on a position of an object recognized in the vicinity of the user in the HMD device 100 according to an embodiment of the present disclosure has been described in detail.

In the following description, an example of displaying notification information in the HMD device 100 according to an embodiment of the present disclosure will be described in more detail with reference to an exemplary view.

Figure 7:
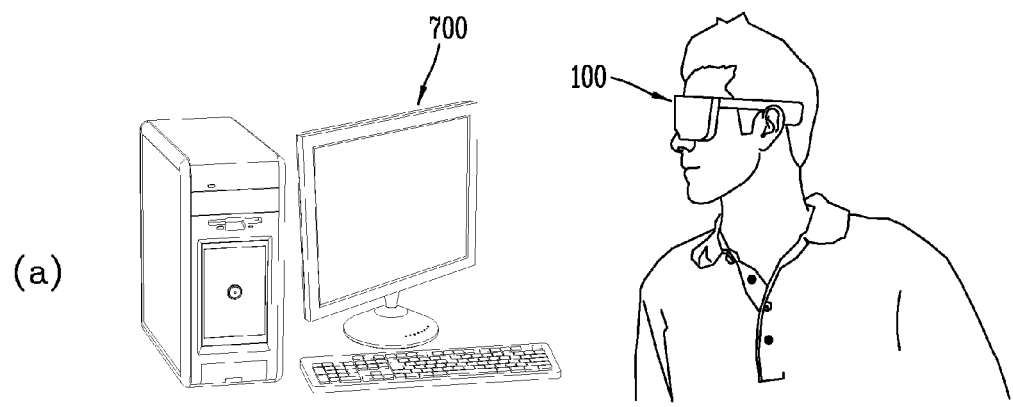
FIG. 7 is an exemplary view illustrating an example in which notification information is displayed in an HMD device according to an embodiment of the present disclosure.
Figure 7:
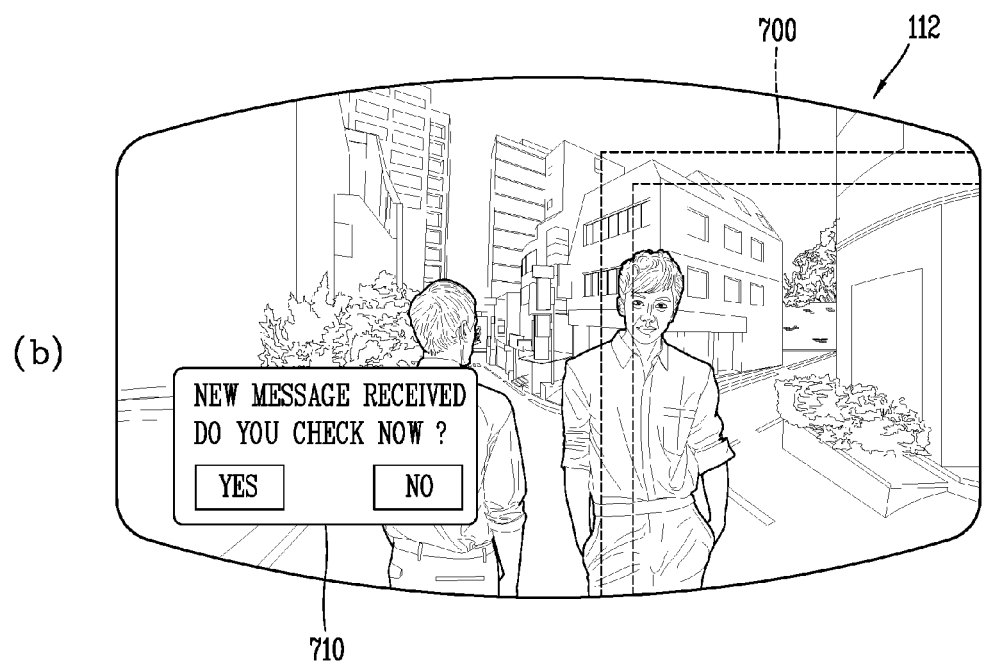

FIG. 7 is an exemplary view illustrating an example in which notification information is displayed in an HMD device according to an embodiment of the present disclosure.

Figure 9A:
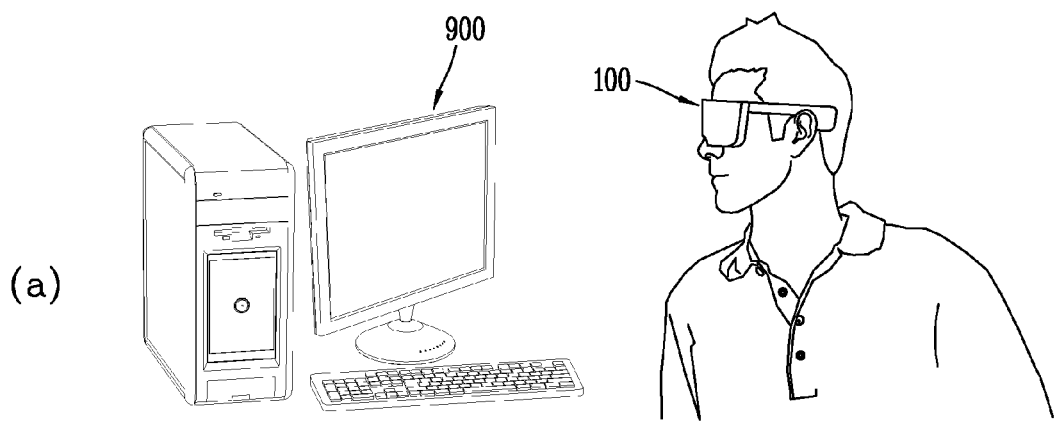
FIGS. 9A and 9B are exemplary views illustrating an example of displaying notification information using a virtual object corresponding to a currently recognized obstacle in an HMD device according to an embodiment of the present disclosure.
Figure 9A:
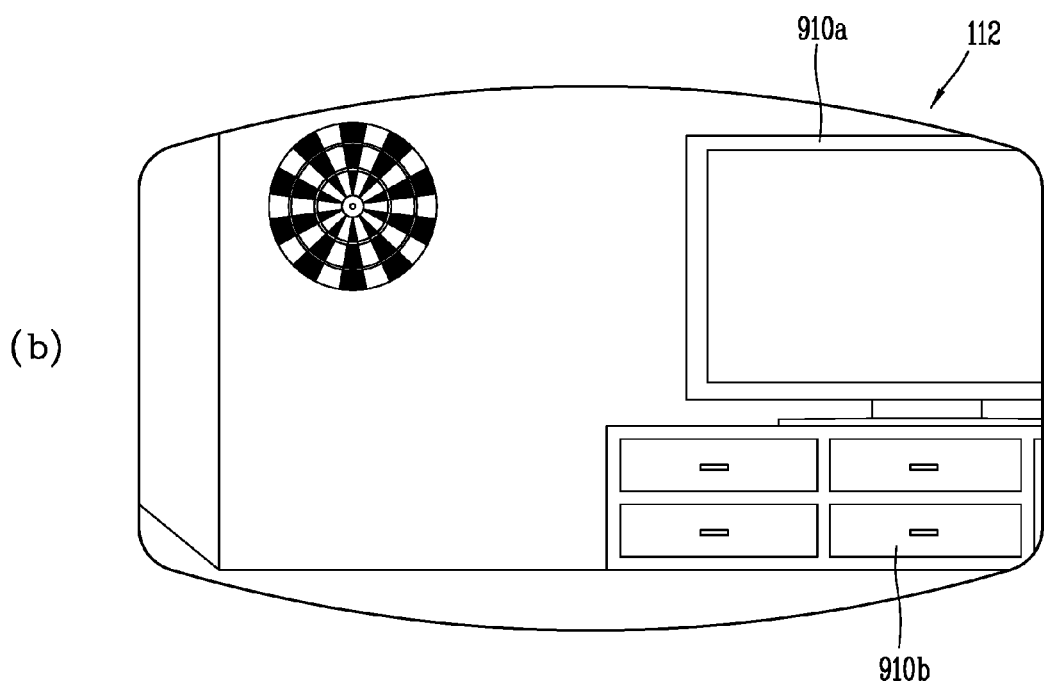

For example, as illustrated in FIG. 7A, when the user wears the HMD device 100 and views a virtual reality content, a virtual reality image displayed for the user may be a view illustrated in FIG. 7B. In this case, the controller 110 of the HMD device 100 according to an embodiment of the present disclosure may recognize an object around the user, namely, a computer monitor 700. Furthermore, as illustrated in FIG. 9A, when a separation distance between the monitor 700 and the user is less than a preset distance (for example, 1 m), the controller 110 may recognize the monitor 700 as a threatening object to the users body, namely, an obstacle.

In this case, when an event that should be notified to the user has occurred, the controller 110 may display notification information for notifying the event to the user on the display unit 112. In this case, the controller 110 may display the notification information 800 in another region excluding a region on the display unit 112 corresponding to a position of the detected obstacle, namely, the monitor 700. FIG. 7B illustrates such an example.

On the other hand, when a region in which the notification information 800 is displayed is determined, the controller 110 may of course evaluate the importance of a virtual reality content displayed in the predetermined region based on a preset criteria. The preset criteria may be an amount of movement of virtual objects displayed in a region in which the notification information 800 is displayed or a state in which virtual objects are displayed in the region, a type of the virtual objects, and the like. Furthermore, when the evaluated importance is less than a preset level, the controller 110 may of course display the notification information in a region different from the currently determined region.

On the other hand, according to the foregoing description, it has been mentioned that the controller 110 of the HMD device 100 according to an embodiment of the present disclosure can display the notification information in a distinguished manner whether or not it is information that requires the user's interaction.

Here, information that requires the user's interaction may be information in which the user should directly check for the content of a new message, an incoming call, or the like as described above. On the contrary, information that does not require the user's interaction may be information unilaterally transferred to the user, namely, a warning notifying battery shortage, information for notifying a current time, information for notifying the user that a preset alarm time has expired, and the like. Furthermore, even though it is information unilaterally transferred to the user, it may be, of course, anytime set to information that requires the user's interaction.

Figure 8:
FIG. 8 is an exemplary view illustrating an example of notification information differently displayed according to whether or not a user's interaction is required in an HMD device according to an embodiment of the present disclosure.
Figure 8:

FIG. 8 is an exemplary view illustrating an example of notification information differently displayed according to whether or not a user's interaction is required in an HMD device according to an embodiment of the present disclosure.

For example, in case of notification information 800 that requires a user's interaction, the controller 110 may display the notification information on the display unit 112 to be located close to the user, for example, to be displayed at a close distance that can be reached if he or she reaches out a hand as illustrated in FIG. 8A. On the contrary, in case of notification information 850 that does not require a user's interaction, the controller 110 may display the notification information to be located far away from the user as illustrated in FIG. 8B.

As described above, the controller 110 may display the notification information on the display unit 112 to have a different perspective based on whether or not it is information that requires a user's interaction. In addition, in case of notification information 850 that does not require a user's interaction, the controller 110 may display a region displayed with the notification information 850 in a semi-transparent manner as illustrated in FIG. 8B, to identify a virtual reality image through a region displayed with the notification information 850.

Figure 9B:
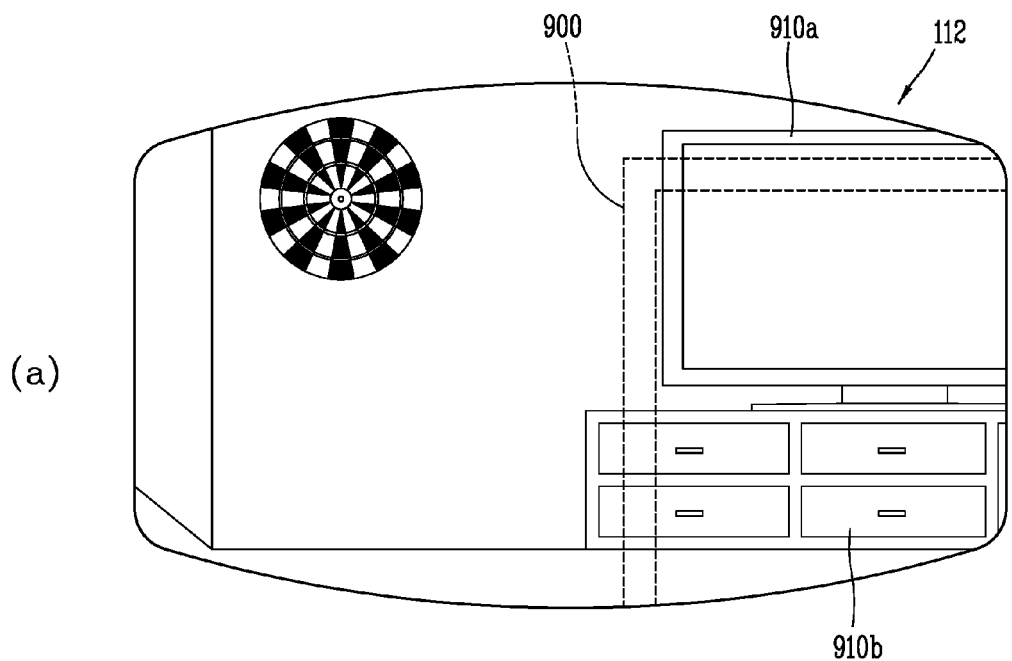
Figure 9B:
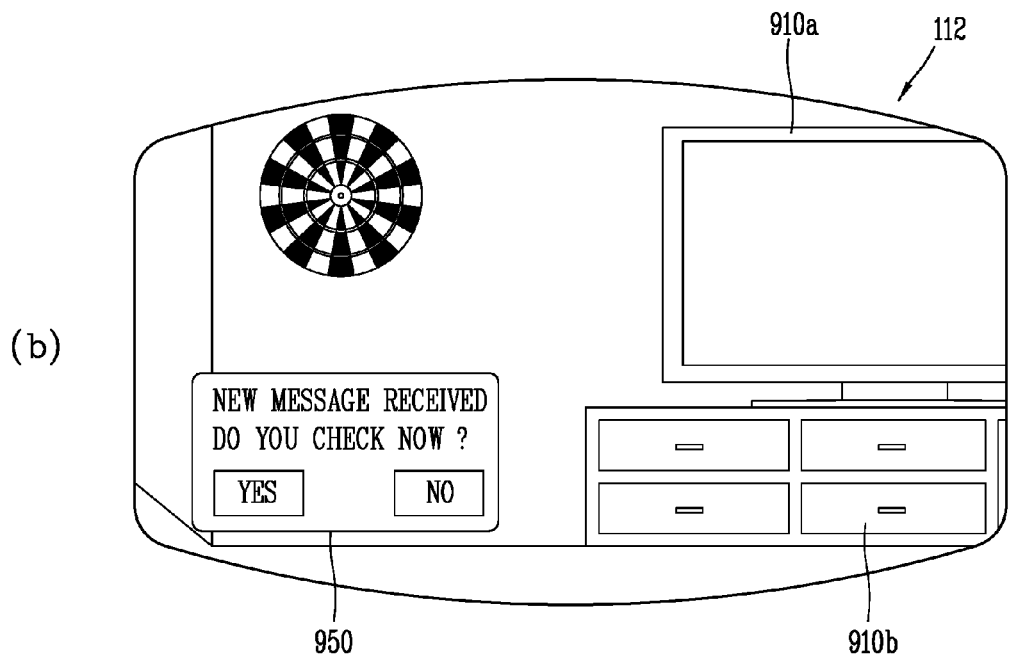

On the other hand, according to the foregoing description, it has been mentioned that the HMD device 100 can display the notification information in another region excluding a region displayed with a virtual object corresponding to the position and shape corresponding to the detected object among objects around the user. FIGS. 9A and 9B illustrates such an example.

First, referring to FIG. 9A, FIG. 9A(a) illustrates an example in which a user wears the HMD device 100, and FIG. 9A(b) illustrates an example of a virtual reality image displayed on the display unit 112 of the HMD device 100 that is worn by the user.

In this state, the controller 110 may detect an obstacle among objects around the user based on a distance between the user and the surrounding objects. Accordingly, a monitor 900 may be detected as an obstacle, and in this case, the controller 110 may select at least one virtual object corresponding to the position and shape of the monitor 900.

In other words, as illustrated in FIG. 9B(a), the controller 110 may select virtual objects displayed in a region corresponding to a position displayed with an obstacle, namely, the monitor 900, from a virtual reality image currently displayed on the display unit 112. As a result, the controller 110 may determine that virtual objects 910a, 910b included in a virtual reality image is at least one virtual object corresponding to the obstacle (monitor) 900.

Furthermore, the HMD device 100 may determine another region on a virtual reality image excluding a region displayed with the virtual objects 910a, 910b determined to correspond to the obstacle (monitor) 900 as a region to be displayed with notification information 950. As a result, as illustrated in FIG. 9B(b), the notification information 950 may be displayed.

In addition, the controller 110 may detect a virtual object corresponding to the obstacle 900 from a virtual reality image based on the characteristics of the detected obstacle 900. For example, the controller 110 may select a chair, a table, a bed or the like as a virtual object corresponding to the detected obstacle according to whether or not the detected obstacle has a horizontal plane above a predetermined size. Otherwise, the controller 110 may select a wall, a door, a window or the like as a virtual object corresponding to the detected obstacle according to whether or not the detected obstacle has a vertical plane above a predetermined size. As a result, the controller 110 may have the most similar characteristics as those of a shape of the detected obstacle, and select a virtual object displayed in a region on a virtual reality image corresponding to a position of the detected obstacle as a virtual object corresponding to the detected obstacle. In other words, as illustrated in FIG. 9B, the controller 110 may have a characteristic, namely, a vertical plane above a predetermined size, shown in the obstacle (monitor) 900, and select virtual objects 910a, 910b displayed in a region corresponding to a position of the detected obstacle 900 as virtual objects corresponding to the detected obstacle 900.

On the other hand, according to the foregoing description, it has been mentioned that when a virtual object corresponding to the detected obstacle is included in a virtual reality image, the controller 110 of the HMD device 100 according to an embodiment of the present disclosure can display notification information based on the virtual object.

Figure 10A:
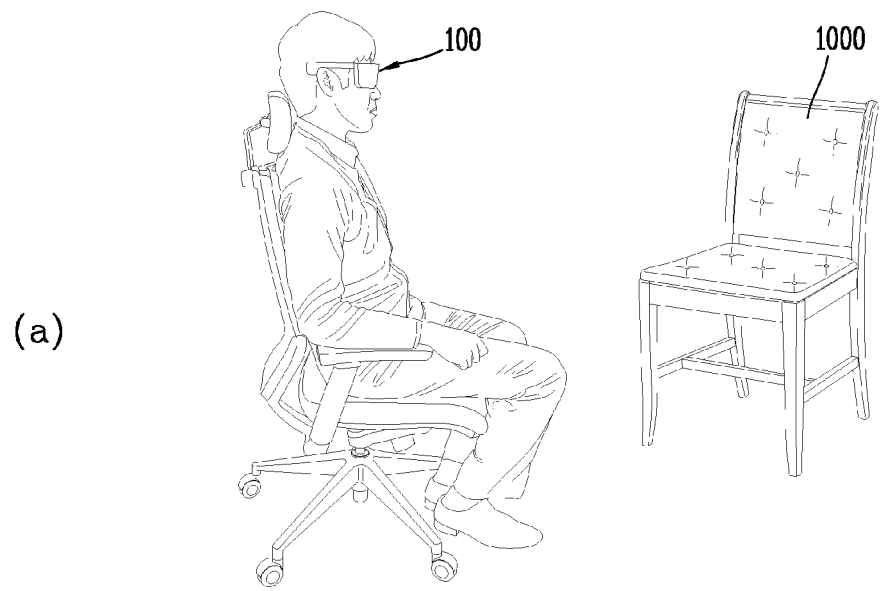
FIGS. 10A and 10B are exemplary views illustrating another example of displaying notification information using a virtual object corresponding to a currently recognized obstacle in an HMD device according to an embodiment of the present disclosure.
Figure 10A:
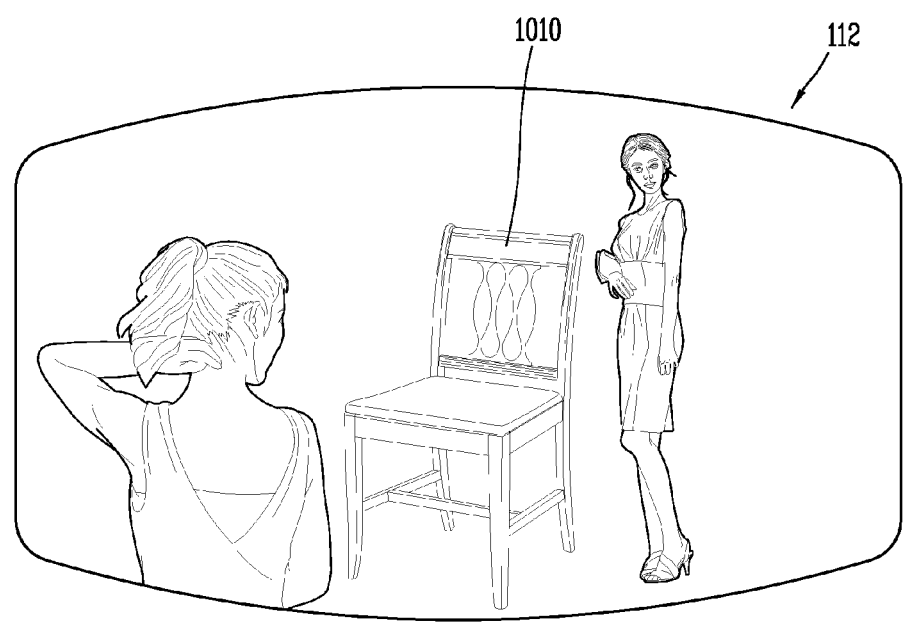
Figure 10B:
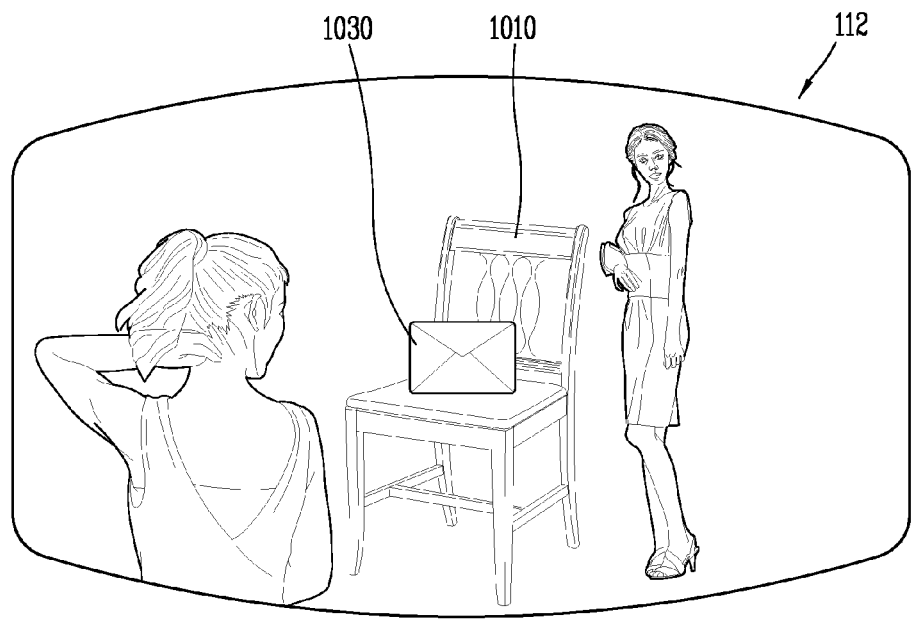
Figure 10B:
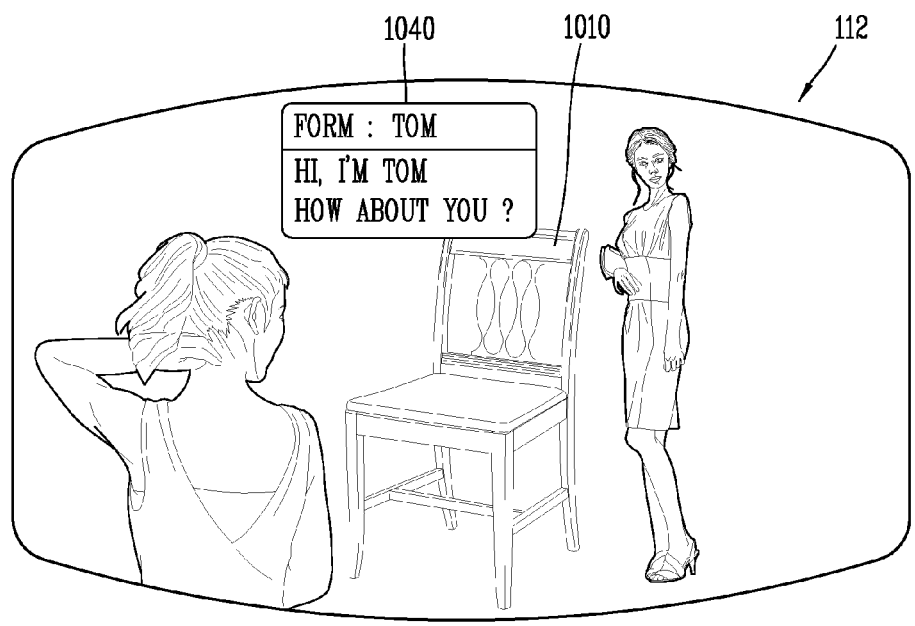

FIGS. 10A and 10B are exemplary views illustrating another example of displaying notification information using a virtual object corresponding to a currently recognized obstacle in an HMD device according to an embodiment of the present disclosure.

First, referring to FIG. 10A, FIG. 10A(a) illustrates an example in which a user wears the HMD device 100 according to an embodiment of the present disclosure to view a virtual reality content, and FIG. 10A(b) illustrates an example of a virtual reality image displayed on the display unit 112 of the HMD device 100 in case of FIG. 10A(a).

For example, as illustrated in FIG. 10A(a), when an obstacle 1000 is detected around a user, the controller 110 may determine whether or not a virtual object corresponding to the detected obstacle 1000 is included in a virtual reality image currently displayed on the display unit 112.

Here, the controller 110 may check whether or not there is information on previously recognized objects at a current place based on a current position of the HMD device 100. Furthermore, when the detected obstacle 1000 is an object previously recognized by the user, the controller 110 may more accurately select a virtual object corresponding to the detected obstacle 1000. As a result, a virtual object 1010 illustrated in FIG. 10A(b) may be selected as a virtual object corresponding to the detected obstacle 1000.

In this state, the controller 110 may display notification information at a preset position based on a currently selected virtual object 1010. For example, when recognizing information on objects, the controller 110 may determine a position at which the notification information is displayed in advance based on the type or shape of the recognized objects. In other words, when the recognized object has a horizontal plane above a predetermined region, the controller 110 may determine the notification information to be displayed in advance in a state of being placed on a virtual object corresponding to the recognized object. Otherwise, when the recognized object has a vertical plane above a predetermined region, the controller 110 may determine the notification information to be displayed in advance in a state of being attached to the recognized object.

In addition, the controller 110 may recognize the shapes of various objects received through the camera 121 using various shape recognition methods, and determine a position at which notification information is displayed according to the recognition result. Furthermore, if the display position of notification information on an object specifically recognized by the user is specified, then the display position of notification information may be of course determined accordingly.

As a result, the controller 110 may determine a position at which notification information is displayed based on a virtual object 1010 selected to correspond to the detected obstacle. Accordingly, as illustrated in FIG. 10A, when the detected obstacle 1000 is a "chair," the controller 110 may determine the display position of the notification information in such a shape that the notification information is placed on the virtual object 1010 corresponding to the "chair," and accordingly, currently generated notification information may be displayed on the display unit 112.

On the other hand, according to the foregoing description, in case of notification information that requires a user's interaction, it has been mentioned that the HMD device 100 according to an embodiment of the present disclosure can display a graphic object corresponding to the notification information on the virtual object 1010, and also display the content of the notification information based on the user's selection to the graphic object.

In other words, as illustrated in FIG. 10B, when the notification information is information that requires a user's interaction, the controller 110 may display a graphic object 1030 corresponding to the notification information at a preset position. For example, when currently generated notification information is a newly received message, the controller 110 may display the graphic object 1030 of a letter envelope as illustrated in FIG. 10B as a graphic object corresponding to the notification information.

Furthermore, when there is a user's selection to the graphic object 1030, the controller 110 may determine that there is the user's selection to currently generated notification information. Furthermore, here, the user's selection may be of course determined by the user's gesture. Accordingly, when the user reaches out a hand to take a gesture of touching the graphic object 1030 in a letter envelope shape, the controller 110 may determine that there is the user's interaction to the notification information. Accordingly, the controller 110 may display the content of the notification information on the display unit 112 as illustrated above in FIG. 10B(b). Here, the controller 110 may of course evaluate the importance of a region displayed with the notification information to determine a region displayed with the notification information according to the evaluation result in displaying the content of the notification information.

On the other hand, on the contrary to the description of FIGS. 10A and 10B, the present disclosure may be also applicable to a case where a virtual object corresponding to a currently detected obstacle 1000 is not included in a virtual reality image currently displayed on the display unit 112. In other words, when a virtual object corresponding to a previously recognized object corresponding to the currently detected obstacle 1000 is not included in the virtual reality image or a virtual object included in the virtual reality image is not displayed at a position corresponding to the detected obstacle 1000, the controller 110 may, of course, newly generate and display a virtual object corresponding to the detected obstacle 1000 or move a virtual object displayed at another position to a position corresponding to the detected obstacle 1000 and display it. In this case, even when a virtual object corresponding to a previously recognized object corresponding to the redetected obstacle 1000 is not included in the virtual reality image, a virtual object 1010 corresponding to the detected obstacle 1000 may be displayed on a virtual reality image as illustrated in FIG. 10A(b).

The foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet). The computer may include the controller 180 of the terminal. The present invention may be embodied in other specific forms without departing from the concept and essential characteristics thereof.

Furthermore, the foregoing description of the present disclosure has mentioned about a HMD device, but the present disclosure may be also applicable to other devices having similar functions. In other words, for example, the present disclosure may be, of course, also applicable to a smart glass or smart lens.

The detailed description is, therefore, not to be construed as illustrative in all respects but considered as restrictive. The scope of the invention should be determined by reasonable interpretation of the appended claims and all changes that come within the equivalent scope of the invention are included in the scope of the invention.

What is claimed is:

1. A head mounted display (HMD) device, comprising:
   a display configured to display a virtual reality image;
   a sensor configured to recognize objects around the HMD device; and
   a controller configured to display notification information associated with a preset event when the preset event occurs,
   wherein the controller detects an obstacle among the recognized objects based on a distance between the HMD device and the obstacle, and determines a position at which the notification information is displayed based on the detected obstacle when the notification information requires a user's gesture interaction, such that the notification information is displayed on a display of the HMD device that avoids a region within the display corresponding to the location of the obstacle with respect to the user, and
   wherein the controller detects, as the obstacle, one or more objects located within a distance of the user's arm length corresponding to a distance between the HMD device and the obstacle, and the detected obstacle is one of the one or more objects.

2. The HMD device of claim 1, wherein the controller recognizes a region corresponding to a position of the detected obstacle from the virtual reality image, and displays the notification information in another region excluding the recognized region.

3. The HMD device of claim 1, wherein the controller selects a virtual reality object corresponding to the detected obstacle from the virtual reality image, and displays the notification information in another region excluding a region on the virtual reality image displayed with the selected virtual reality object.

4. The HMD device of claim 1, wherein the controller distinguishes and displays notification information that requires the user's interaction and notification information that does not require the user's interaction in a separate manner.

5. The HMD device of claim 4, wherein the controller determines whether or not the notification information is notification information that requires the user's interaction based on whether the notification information requires the user's check or the notification information unilaterally transfers information to the user.

6. The HMD device of claim 4, wherein the notification information that requires the user's interaction is an short messaging service (SMS) or social network service (SNS) message or notification information for notifying an incoming call.

7. The HMD device of claim 4, wherein when the notification information includes notification information that requires the user's interaction and notification information that does not require the user's interaction, the controller displays the notification information that requires the user's interaction with a different perspective than the notification information that does not require the user's interaction.

8. The HMD device of claim 4, wherein the controller displays the notification information that does not require the user's interaction, in such a manner that a virtual reality image displayed in a region displayed with the notification information can be identified through the region displayed with the notification information.

9. The HMD device of claim 1, wherein the controller selects a virtual object corresponding to the detected obstacle from the virtual reality image, and displays the notification information based on a shape of the selected virtual object.

10. The HMD device of claim 9, wherein when the selected virtual object is a table or chair, the controller displays the notification information in a shape in which the notification information is placed on the virtual object.

11. The HMD device of claim 9, wherein the controller displays the notification information with a graphic object in a shape attached to a surface of a virtual object corresponding to the detected obstacle.

12. The HMD device of claim 1, wherein when a position at which the notification information is displayed is determined, the controller further evaluates the importance of a virtual reality image displayed at the determined position to change the position at which the notification information is displayed.

13. The HMD device of claim 12, wherein the controller evaluates the importance according to at least one of the movements or display state of virtual objects on a virtual reality image displayed at the determined position, and the types of the virtual objects.

14. The HMD device of claim 13, wherein the controller displays the notification information in another region excluding a region on a virtual reality image with an amount of movement of the virtual objects above a preset level based on the evaluated importance or displayed in a state that the virtual objects are close up or a region on a virtual reality image in which the virtual object is displayed as a subtitle or instruction.

15. The HMD device of claim 1,
   wherein the sensor is further configured to sense a current position, and
   wherein the controller stores a result of recognizing at least one object located at a specific place according to a selection of the user, and recognizes objects around the user using recognition results of prestored objects when the current position is the specific place as a result of sensing the current position.

16. The HMD device of claim 1, further comprising:
   a camera capable of receiving an image for objects around the user,
   wherein when the object is recognized and the obstacle is detected based on the image, the controller selects a virtual object corresponding to a shape of the detected obstacle from a virtual reality image currently displayed on the display.

17. The HMD device of claim 16, wherein when a virtual object corresponding to a shape of the detected obstacle is not included in the virtual reality image, the controller generates and displays a virtual object corresponding to the shape of the detected obstacle on the virtual reality image.

18. The HMD device of claim 16, wherein the controller determines a position at which notification information is displayed based on a shape of the detected obstacle.

19. A control method of a head mounted display (HMD) device, the method comprising:
   displaying a virtual reality image, and recognizing objects around a user;
   detecting an obstacle that is among the recognized objects and located within a distance of the user's arm length corresponding to a distance between the HMD device and the detected obstacle;
   detecting whether or not a preset event has occurred; and
   displaying notification information corresponding to the preset event and that requires a user's gesture interaction on the virtual reality image based on a position of the detected obstacle when the preset event has occurred, such that the notification information is displayed on the HMD device that avoids a region within the display corresponding to the location of the obstacle with respect to the user.

* * * * *